United States Patent [19]

Garcea

[11] Patent Number: 4,539,815
[45] Date of Patent: Sep. 10, 1985

[54] SUPERCHARGING SYSTEM FOR INTERNAL COMBUSTION ENGINES

[75] Inventor: Giampaolo Garcea, Milan, Italy

[73] Assignee: Alfa Romeo Auto S.p.A., Napoli, Italy

[21] Appl. No.: 687,818

[22] Filed: Dec. 13, 1984

Related U.S. Application Data

[63] Continuation of Ser. No. 404,594, Jul. 30, 1982, abandoned.

[30] Foreign Application Priority Data

Aug. 6, 1981 [IT] Italy ............................... 23408 A/81

[51] Int. Cl.³ ............................................. F02B 37/00
[52] U.S. Cl. .................................... 60/599; 123/556; 123/559; 123/563
[58] Field of Search .................. 60/599; 123/559, 563, 123/556

[56] References Cited

U.S. PATENT DOCUMENTS

| 1,935,186 | 11/1933 | King | 123/563 |
| 2,646,027 | 7/1953 | Ackerman | 123/563 |
| 2,748,562 | 6/1956 | Kauffmann | 60/599 |
| 2,776,562 | 1/1957 | Davie | 165/4 |
| 2,891,774 | 6/1959 | Theoclitus | 165/4 |
| 3,211,362 | 10/1965 | Laskey | 60/599 |

Primary Examiner—Douglas Hart
Attorney, Agent, or Firm—Charles A. Brown; Charles E. Brown

[57] ABSTRACT

The invention relates to an improvement in internal combustion engines equipped with a compressor for the feeding air, according to which the intake duct is equipped with a heat-exchanging element for cooling the air when the latter is compressed to a comparatively high pressure.

5 Claims, 4 Drawing Figures

SUPERCHARGING SYSTEM FOR INTERNAL COMBUSTION ENGINES

This is a continuation of application Ser. No. 404,594 filed July 30, 1982, and now abandoned.

As is known, in internal combustion engines having a compressor for the feeding air, the power increase which is achieved by adopting such a compressor is essentially correlated with the increase of density that the air undergoes within the compressor: said power increase is thus the higher, the higher is the increase of the air pressure and is the lower, the higher is the temperature increase.

If the engine is of the spark ignition type, a high feeding temperature is detrimental in that it encourages the occurrence of the knocking phenomena and may be such as to compel to reduce the compression volumetric ratio in order to prevent it.

It is thus vital that the adiabetic efficiency of the compressor is high so that, for the same feeding pressure, the temperature is as low as practicable.

However, even with a good efficiency of the compressor, the temperature is still rather high and is the higher, the higher is the feeding pressure.

The advisability is often felt of inserting in the feeding air loop downstream of the compressor and upstream of the engine cylinders, a heat exchanger.

By virtue of such a heat exchanger, the feeding air is cooled because the calories contained therein are partially transferred to another cooling fluid: the latter can be external air or also a liquid (to be cooled in its turn by external air in an additional heat exchanger).

The bulk, the cost and also the efficiency of such heat exchangers are such, however, as to advice against their adoption and this is especially the case with internal combustion engines for motor vehicles.

It is just for the case of motor cars that it has been envisaged to replace the heat exchanger as referred to above by a device which, with the same efficiency, is both simpler and lighter, less bulky and cheaper.

Said device can be adopted in all cases of supercharged engines for motor vehicles because in this particular application supercharging is used only occasionally, that is to say, when the vehicle requires a high power for pick up.

This means that, in use, when the vehicle is not accelerated, the air in the feeding duct upstream of the cylinders is not heated because it has not been compressed in the compressor.

The device suggested by this invention is composed of a heavy element which is so shaped as to have a very wide surface area to be swept by the feeding air.

This heavy element can be a metallic block, that is for example, a pack of folded metal sheet through which air flows in the direction of the folded edges, or a bundle of tiny metal tubes arranged in the interior of the intake duct: said tubes are thus swept by the induced air both on the inside and the outside. The sheet metal or the metal tubes aforementioned can be, for example, made of aluminium or at any rate a material having fair heat-transferring properties.

During the normal use of the vehicle, that is during the travel between an acceleration and the next, the metallic block aforesaid is brought to the normal temperature of the intake air, that is to a temperature slightly above the outer ambient temperature.

During an acceleration stroke the air emerging at a high temperature from the compressor enters the block: on account of the considerable extension of the swept surface and the heat-transfer coefficient between the air and the walls of the block, at the start of an acceleration stage, air leaves the block after having been cooled considerably, that is, to a temperature close to the temperature the block had initially.

Subsequently, as the block becomes hotter, the cooling undergone by the air is less intense, but if one considers that the acceleration of a vehicle, on taking into account also the imposed speed limits, does seldom last more than 10 to 20 seconds, cooling can be very intense also on completion of an acceleration stroke.

As a matter of fact, if the weight of air flowing through the block during a 10-second pick up is $\frac{1}{2}$ kg and if the weight of the block is 2 kg, assuming that the block is of aluminium, inasmuch as the specific heat of air is 0.24 Cal/kg °C. and that of aluminium is about 0.23, by equating the quantity of heat lost by the air to the quantity of heat acquired by the block, the result is that, as an average, the block is heated by a number of degrees centigrade which is one fourth of the number of degree centigrade by which air is cooled.

If, at a start of an acceleration stroke the temperature of the block is 15° C., assuming that compressed air enters the block at 90° C. and is cooled, as an average, by 40° C. (during 10 seconds), the result is that, after a 10-second acceleration the temperature of the block has been raised only from 15° C. to 25° C. The temperature would rise from 15° C. to 35° C. if the weight of the aluminium block were 1 kg instead of 2 kg.

In order that a fair operation of the system might be achieved, it has been checked that the ratio of the surface of the block "S" to the surface of the manifold section "$S_1$" in which the block is housed must be $S:S_1$ greater than 12.

All this can be best understood with the aid of the accompanying drawings of which FIG. 1 is a schematic plan view with parts broken away showing a turbocharged gasoline engine having incorporated therein a supercharging system in accordance with this invention.

Figure 1:
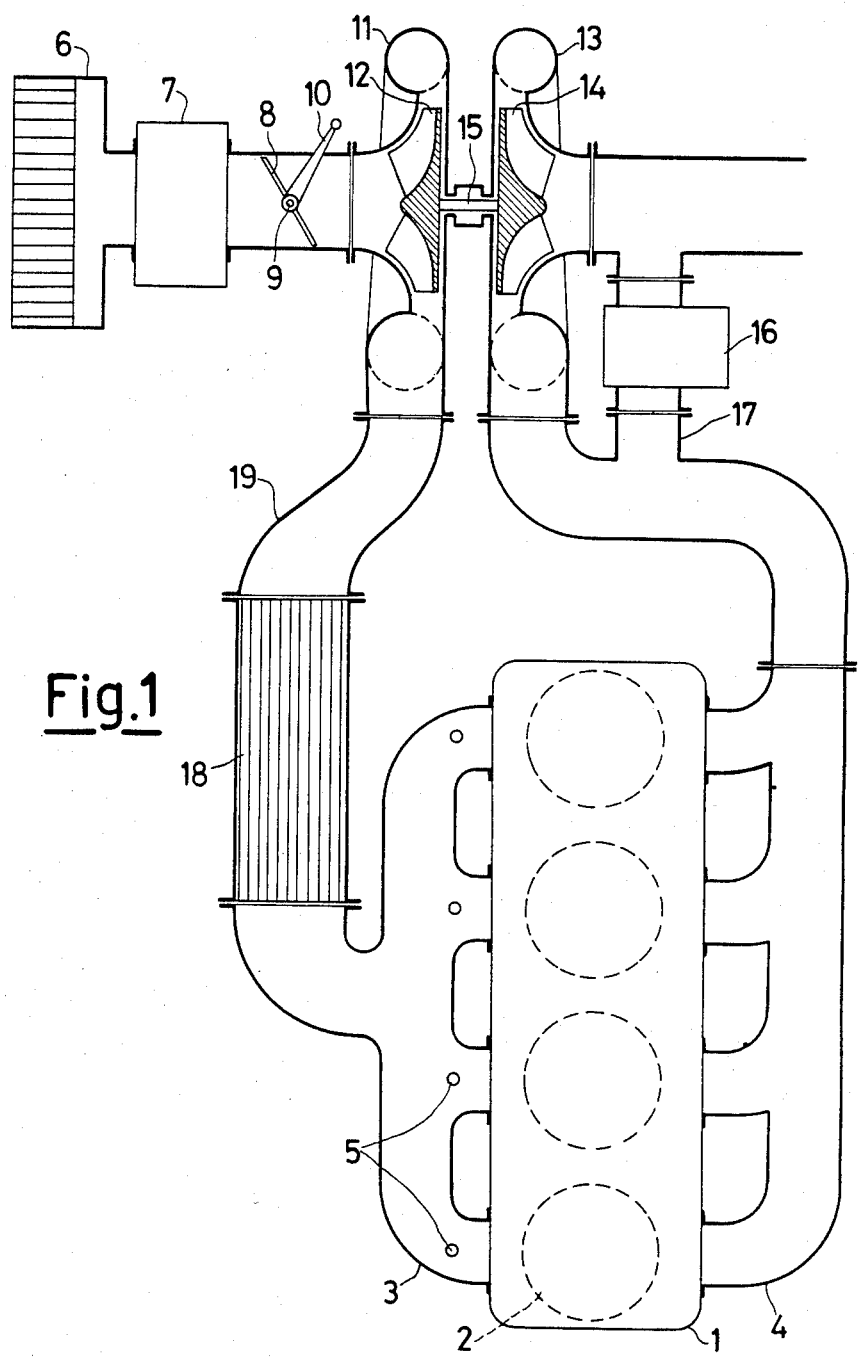

In FIG. 1 there is shown at 1 the head of a 4-cylinder engine in which the dotted circles 2 correspond to the four explosion chambers: there are indicated, then, at 3, the intake manifold and at 4 the exhaust manifold, which are flangedly connected to the engine head 1 in registry with the intake and exhaust ports of the several cylinders.

There are indicated at 5 the four gasoline injectors which spray gasoline into the four intake ducts since in the embodiment of FIG. 1 the engine is (by way of example only and without limitation) an internal combustion engine with injection fuel feed.

It is indicated, at 6, then, the air filter through which the outside air is drawn by the engine, at 7 (still by way of example) a device for metering the airflow drawn by the engine for regulating the quantity of gasoline to be dispensed by the injectors 5 and at 8 there is indicated the engine throttling butterfly which is integral with the shaft 9 as rotated by the lever 10 connected to the accelerator pedal of the vehicle.

The supercharging system exemplified in FIG. 1 consists, in the first place, of a conventional exhaust gas turbocompressor composed of a centrifugal compressor with its body 11 and its rotor 12, and of a centripetal turbine with its body 13 and its rotor 14. The two rotors are keyed to the same shaft 15 so that the expansion power of the exhaust gases; collected by the rotor 14, is transferred onto the rotor 12 so that the latter compresses the air drawn by the engine.

At 16 there is indicated a valve arranged in the duct 17 which is positioned in parallel relative to the centripetal turbine so that, when the valve 16 is closed, all the stream of the exhaust gases of the engine is exploited in the turbine itself to compress the air drawn by the engine: when the valve 16 is either partially or fully open, the rate of flow of gas exploited for compressing the air is lesser or is at a minimum.

The supercharging system of FIG. 1 also comprises the metal block 18 inserted between the duct 19 at the outlet of the centrifugal compressor and the intake manifold 3: it is the presence of said block 18 which characterizes the supercharging system according to the present invention. Thus, all the air drawn by the engine flows through said block, which is in the form of a heat sink and is made, for example, of aluminium, and the thin sheet metal the block is made of in its interior are so arranged as to provide a flow of air virtually without any abrupt variations of the direction of flow and at a virtually constant speed along the route, so that the pressure drop along the flow path is minimized.

During the normal use of the motor car at a not too high speed which is constant with fair approximation, so that the engine RPM is not too high and the butterfly 8 is partially open, the power available for the turbine is scanty and is further reduced if, under these conditions of use the valve 16 is automatically arranged is opening conditions.

The result is that the compression undergone by the air in the compression is at a minimum, if not zero: correspondingly, a minimum, or zero, is the temperature increase the air undergoes relative to the outer ambient temperature.

As this air flows through the block 18 during the normal use, the block thus takes a temperature which not very much above that of the outside atmosphere.

As an acceleration is made with the butterfly 8 fully open and the valve 16 closed, the turbocompressor has its RPM increased and air flows out of the compressor at a high temperature and under a high pressure: when flowing through the block, which, due to its thermal inertia, is at a low temperature during the entire acceleration stroke which lasts, for example 10 seconds or 20 seconds, the compressed air is considerably cooled while the block 18 is but slightly warmed up.

In order that such a result may be achieved, apparently, the block, which is preferably made of aluminium due to the high specific heat of that material, must have a sufficiently wide superficial area and its weight must be sufficient, as outlined above, and also the heat-transfer coefficient by convection between the air and the block wall must be reasonably high.

Figure 2:
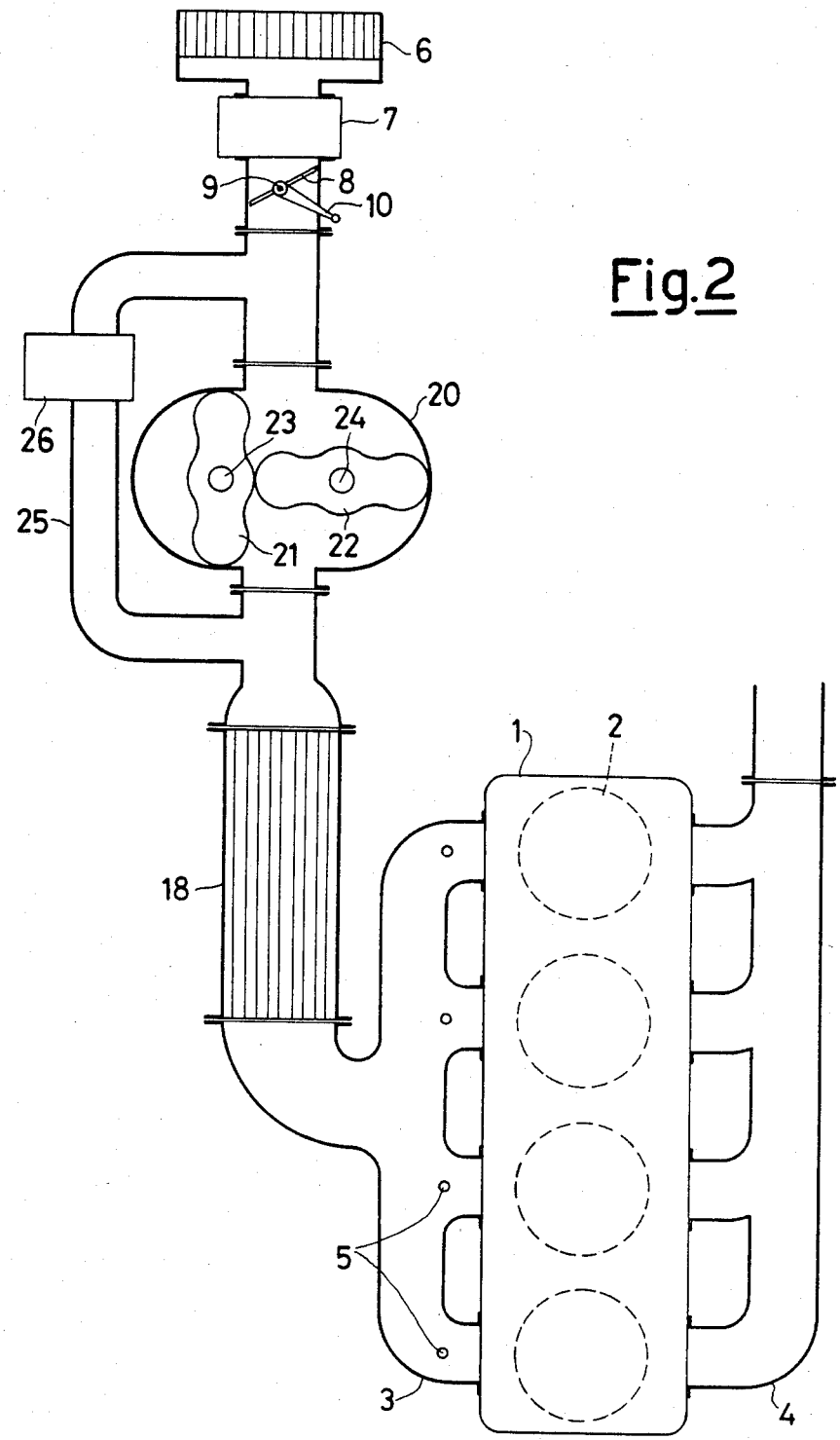
FIG. 2 is a schematic plan view with parts in section showing a modified type of supercharger.

In FIG. 2, conversely, there has been diagrammatically shown another supercharging system for the engine, which, however, has still as a component part the block 18 which characterizes the system suggested by the present invention.

The numerals of FIG. 1 which appear in FIG. 2 retain their original meaning.

In the system of FIG. 2 the drawn in air is compressed, rather than by a turbocompressor, by a volumetric compressor: in the example shown in FIG. 2, this is a Roots type compressor consisting of a body 20 in which the lobed rotors 21 and 22 keyed to the shafts 23 and 24 are mutually phased relative to one another and in couter-rotation relationship, and are driven to rotation by the mainshaft of the engine via drive transfer mechanisms not shown herein.

At 25 there is shown a short-circuiting loop for the compressor and at 26 there is indicated a valve arranged within said duct 25.

Obviously, instead of the volumetric Roots type compressor, the compressor could well be of the paddle type, still driven to rotation by the engine mainshaft.

Inasmuch as with volumetric type compressors the compression of the drawn in air is a function of the increased volumetric rate of flow of the compressor relative to the engine, when air compression is not required (for example during the normal use of the vehicle at a speed which is constant and is not too high), the excess rate of flow of the compressor is fed back from the delivery side to the induction side of the compressor through the duct 25 and the valve 26, the latter being open under such conditions of use.

In normal use and at a not too high and constant speed, consequently, the air stream flowing through the block 18, since it has not been compressed, is cold and keeps the block 18 cool.

Also in this case, as it occured with the system of FIG. 1, as an acceleration stroke is started and during it, the block 18, which is kept sufficiently cool due to it thermal inertia, cools the air which exits the compressor after having been both compressed and heated.

Figure 3:
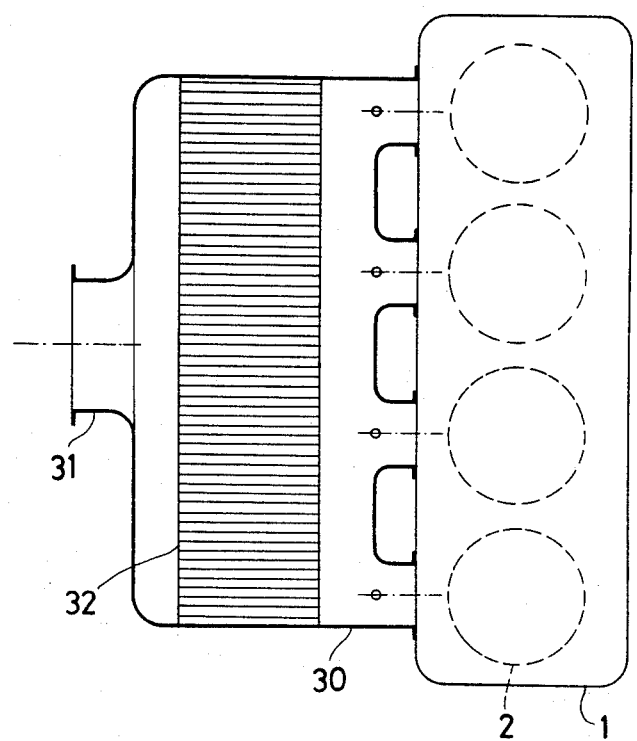
FIG. 3 is a fragmentary schematic plan view showing most specifically the details of an intake manifold formed in accordance with this invention.

In FIG. 3 there is indicated at 1 the engine head and at 2 there are indicated the four explosion chambers, just as in FIGS. 1 and 2.

Instead of the manifold 3 of FIGS. 1 and 2, the manifold 30 is so shaped as to contain the block 32 in its interior.

The air drawn by the engine enters the manifold 30 through the inlet 31 after having left the compressor (not shown in the drawing) and then sweeps the surfaces of the walls which of the block 32 and energes in correspondence with the intake ducts of the individual cylinders.

The behaviour of the block 32 is thus very much the same as that of the block 18 of FIGS. 1 and 2 aforesaid.

Figure 4:
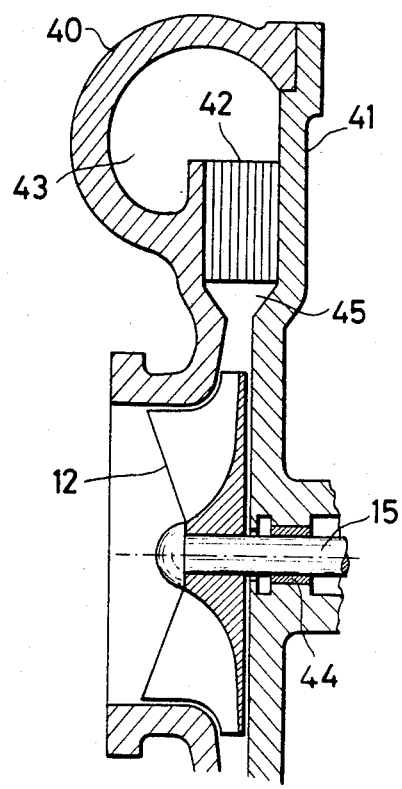
FIG. 4 is an enlarged fragmentary sectional view taken through the compressor stage of the turbocharger of FIG. 1.

FIG. 4 shows a partial cross-sectional view of a centrifugal compressor, the cross-section having been taken along a plane passing through the axis of rotation of the rotor.

It is, for example, a compressor of the kind of that shown in FIG. 1, driven by an exhaust gas turbine (not shown in FIG. 4).

The compressor body, symbolically indicated at 11 in FIG. 1, is composed, in the embodiment of FIG. 4, of two shells 40 and 41.

The rotor and its shaft have been indicated at 12 and 15 similarly to what has been made in FIG. 1; the shaft 15 rotates in the bearing 44 integral with the halfshell 41.

The annular section included between the two halfshells about the rotor is shaped conventionally, that is in such a way as to provide a diffuser 45 in which a considerable fraction of the peripheral speed of the air emerging from the rotor is converted into pressural power.

Immediately past said annular diffusion section, there is indicated at 42 in FIG. 4 the block, composed, for example, of the assembly of planar annular metal sheets which are swept by the air coming from the rotor and the diffuser and thus from the compressor and the air is discharged in the approximately toroidal space 43 and therefrom into the engine intake manifold.

The behavior of the block 42 is thus entirely similar to that of the block 18 of FIGS. 1 and 2.

What has been said hereinbefore for the several supercharging systems of the several Figures of the drawings, holds good, of course, also for the case in which the compressor is a device of the aerodynamic compression wave type such as COMPREX and, in the case in which the internal combustion engine is fed by carburetters and also for the case of Diesel engines.

I claim:

1. A supercharging system for an internal combustion engine of a motor vehicle, said supercharging system having an air capacity which is delivered during non-acceleration and acceleration periods of operating requirements of the internal combustion engine and wherein in the non-acceleration periods of the internal combustion engine air delivered by said supercharging system is only slightly compressed and thus only slightly heated with the air supplied by said supercharging system being available as a coolant; said supercharging system comprising compressor means for supplying air at different pressures and in different volumes to meet different air capacities required during both non-acceleration and acceleration periods of the internal combustion engine, said compressor means having coupled thereto conduit means for delivering air from said compressor means to the internal combustion engine, and a self-contained heat exchanger means mounted in said conduit means, said heat exchanger means being in the form of an accumulator for absorbing heat of air compressed by said compressor during the acceleration periods and for releasing heat to air slightly compressed by said compressor means during the non-acceleration periods of the internal combustion engine whereby the temperature of the internal combustion engine and the supercharging system is maintained at a low degree and reduces the occurrence of engine knocking phenomena, and said accumulator being in the form of a block composed of an assembly of thin metal walls extending longitudinally of said conduit means and permitting air to flow therebetween.

2. A supercharging system according to claim 1 wherein said conduit means includes a casing having an inlet port and an outlet port, said assembly of thin metal walls being contained with said casing, and said casing forming means for guiding and containing the air stream which flows through said conduit means and sweeps surfaces of said thin metal walls between said inlet port and said outlet port.

3. A supercharging system according to claim 1 wherein said conduit means includes an engine intake manifold, and said accumulator is positioned within said engine intake manifold.

4. A supercharging system according to claim 1 wherein said compressor has a body forming part of said conduit means, and said accumulator is in said body and is engaged by compressed air within said compressor.

5. A supercharging system according to claim 1 wherein said thin metal walls are in the form of low thickness metal sheets having spaced surfaces.

* * * * *